(12) United States Patent
Cane et al.

(10) Patent No.: US 7,509,356 B2
(45) Date of Patent: Mar. 24, 2009

(54) DATA BACKUP

(75) Inventors: David A. Cane, Cambridge, MA (US); Gurami Palagashvili, Natick, MA (US); Michael R. Boucher, Somerville, MA (US); Dwayne A. Carson, Mendon, MA (US)

(73) Assignee: Iron Mountain Incorporated, Boston, MA (US)

( * ) Notice: Subject to any disclaimer, the term of this patent is extended or adjusted under 35 U.S.C. 154(b) by 14 days.

(21) Appl. No.: 10/235,304

(22) Filed: Sep. 5, 2002

(65) Prior Publication Data

US 2003/0135524 A1 Jul. 17, 2003

Related U.S. Application Data

(60) Provisional application No. 60/317,684, filed on Sep. 6, 2001.

(51) Int. Cl.
*G06F 17/30* (2006.01)

(52) U.S. Cl. ........................ 707/204; 707/202

(58) Field of Classification Search ............ 707/1, 707/5, 8, 202, 204, 200; 711/114, 161, 202
See application file for complete search history.

(56) References Cited

U.S. PATENT DOCUMENTS

| | | | | |
|---|---|---|---|---|
| 5,613,113 A * | 3/1997 | Goldring | ................ | 707/202 |
| 5,758,359 A * | 5/1998 | Saxon | ................ | 707/204 |
| 5,765,173 A * | 6/1998 | Cane et al. | ................ | 707/204 |
| 5,819,251 A * | 10/1998 | Kremer et al. | ................ | 707/1 |
| 5,907,848 A * | 5/1999 | Zaiken et al. | ................ | 707/202 |
| 5,974,563 A * | 10/1999 | Beeler, Jr. | ................ | 714/5 |
| 5,991,772 A * | 11/1999 | Doherty et al. | ................ | 707/202 |
| 6,032,145 A * | 2/2000 | Beall et al. | ................ | 707/5 |
| 6,038,665 A * | 3/2000 | Bolt et al. | ................ | 713/176 |
| 6,088,693 A * | 7/2000 | Van Huben et al. | ................ | 707/8 |
| 6,088,694 A * | 7/2000 | Burns et al. | ................ | 707/8 |
| 6,115,772 A * | 9/2000 | Crater | ................ | 710/306 |
| 6,141,660 A * | 10/2000 | Bach et al. | ................ | 707/103 R |
| 6,157,931 A * | 12/2000 | Cane et al. | ................ | 707/204 |
| 6,189,016 B1 * | 2/2001 | Cabrera et al. | ................ | 707/203 |
| 6,199,074 B1 * | 3/2001 | Kern et al. | ................ | 707/204 |
| 6,212,512 B1 * | 4/2001 | Barney et al. | ................ | 707/1 |
| 6,269,381 B1 * | 7/2001 | St. Pierre et al. | ................ | 707/202 |
| 6,279,011 B1 * | 8/2001 | Muhlestein | ................ | 707/204 |
| 6,317,755 B1 * | 11/2001 | Rakers et al. | ................ | 707/204 |
| 6,374,265 B1 * | 4/2002 | Chen et al. | ................ | 707/204 |
| 6,397,307 B2 | 5/2002 | Ohran | ................ | 711/161 |
| 6,460,055 B1 * | 10/2002 | Midgley et al. | ................ | 707/204 |
| 6,513,051 B1 * | 1/2003 | Bolosky et al. | ................ | 707/204 |

(Continued)

FOREIGN PATENT DOCUMENTS

JP 2000-200208 7/2000

*Primary Examiner*—Shahid A Alam
(74) *Attorney, Agent, or Firm*—Finnegan, Henderson, Farabow, Garrett & Dunner, LLP (57) ABSTRACT

A system for backing up desired data includes a communication link configured to transfer information between the system and a backup storage for storing backed up data, and a processor coupled to the communication link and configured to: determine associated substantive data of the desired data, compare the associated substantive data of the desired data with stored data, and transfer the associated substantive data over the communication link for storage based on the comparison of the associated substantive data with the stored data.

19 Claims, 7 Drawing Sheets

U.S. PATENT DOCUMENTS

| | | | |
|---|---|---|---|
| 6,526,418 B1* | 2/2003 | Midgley et al. | 707/204 |
| 6,745,209 B2* | 6/2004 | Holenstein et al. | 707/203 |
| 6,820,098 B1* | 11/2004 | Ganesh et al. | 707/202 |
| 6,898,688 B2* | 5/2005 | Martin et al. | 711/202 |
| 2002/0078244 A1* | 6/2002 | Howard | 709/248 |
| 2002/0083037 A1* | 6/2002 | Lewis et al. | 707/1 |
| 2002/0112022 A1* | 8/2002 | Kazar et al. | 709/217 |
| 2004/0260873 A1* | 12/2004 | Watanabe | 711/114 |

* cited by examiner

DATA BACKUP

CROSS-REFERENCE TO RELATED ACTIONS

This application claims the benefit of U.S. Provisional Application No. 60/317,684 filed Sep. 6, 2001.

FIELD OF THE INVENTION

The invention relates to backing up data and more particularly to backing up non-deterministic files.

BACKGROUND OF THE INVENTION

Safeguarding electronic data by backing the data up is a common event, and an event that consumes increasing amount of memory and processing power. Data files today typically occupy much more memory than with previous software programs and thus backing these files up requires more storage space, and more processing power and communication-link bandwidth to transfer and store the files. With enormous amounts of data to back up, it is desirable to reduce data backup to not back up data that has not changed, and to back up as few copies (preferably one) of a file as possible.

A number of techniques have been developed for network-based computer backup systems that greatly reduce the bandwidth and storage needs of the backup system. Two examples are differential file backup and common file elimination (e.g., Cane et al, U.S. Pat. No. 5,765,173). Generally, differential file backup is performed by determining changes that have occurred within a file using a set of hash codes that represents the information within the file, as it previously existed, in fixed-size blocks. These hash codes are matched up against the same file now modified, determining those areas of the file that have changed and those that areas of the file that have not changed. This results in significant bandwidth and space savings for sending and storing the portions of the file that have changed. Common file elimination determines whether a file to be backed up is the same as other files to be backed up (e.g., a file already backed up), and if so, stores only one copy of that file. Common file elimination techniques can be applied to data groups other than files.

SUMMARY OF THE INVENTION

In general, in an aspect, the invention provides a system for backing up desired data, the system including a communication link configured to transfer information between the system and a backup storage for storing backed up data, and a processor coupled to the communication link and configured to: determine associated substantive data of the desired data, compare the associated substantive data of the desired data with stored data, and transfer the associated substantive data over the communication link for storage based on the comparison of the associated substantive data with the stored data.

Implementations of the invention may include one or more of the following features. The processor is configured to bypass at least some of the associated data, for transfer for storage, that are present in the stored data. The processor is configured to transfer the associated substantive data for storage only if the associated substantive data are absent from the stored data. The processor is configured to determine the associated substantive data by analyzing a structure of the desired data and data associated with portions of the structure. The processor is configured to map the associated substantive data to a change-resistant format and to compare the associated substantive data with the stored data using the change-resistant formatted substantive data. The processor is configured to perform differential backup on the associated substantive data to compare the associated substantive data with the stored data.

Implementations of the invention may also include one or more of the following features. The processor is further configured to transfer, over the communication line, indicia that substantive data are absent from the stored data and that substantive data in the stored data are absent from the associated substantive data. The indicia include at least one of an add key command, an add value command, a remove key command, a remove value command, and a change value command. The processor is configured to determine the associated substantive data by determining groupings of data within the desired data. The processor is configured to determine the groupings of data by analyzing indexes associated with the desired data. The processor is configured to perform common file elimination on the groupings of data to compare the associated substantive data with the stored data. The processor is further configured to transfer, over the communication line, indicia of relationships of data groupings that exist in the stored data to the associated substantive data.

In general, in another aspect, the invention provides a computer program product residing on a computer-readable medium comprising computer-executable instructions for causing a computer to analyze aggregate data comprising substantive data and filler data at a plurality of levels, determine the substantive data indicative of levels and values associated with the levels of the aggregate data, and compare the determined substantive data with stored data to determine differences in substantive content of levels and values between the determined substantive data and the stored data.

Implementations of the invention may include one or more of the following features. The instructions for causing the computer to compare cause the computer to apply a differential backup technique. The instructions cause the computer to store the determined substantive data in a change-resistant format. The instructions for causing the computer to compare cause the computer to apply a differential backup technique, the instructions further comprising instructions for causing the computer to backup at least the substantive data that are in the change-resistant format and that are absent from the stored data. The instructions cause the computer to provide add indicia that the determined substantive data include data absent from the stored data and to provide remove indicia that the stored data include data absent from the determined substantive data.

In general, in another aspect, the invention provides a computer program product residing on a computer-readable medium comprising computer-executable instructions for causing a computer to analyze a data containing data subgroups, identify the data subgroups within the data file, compare the data subgroups with stored potentially-common data sets, and back up data subgroups based upon the comparison.

Implementations of the invention may include one or more of the following features. The instructions cause the computer to back up only those data subgroups that are absent from the stored potentially-common data sets. The instructions cause the computer to store the data subgroups as separate files for comparison. The instructions cause the computer to compare the data subgroups with the stored potentially-common data sets using a common file elimination technique. The instructions cause the computer to provide remove indicia indicating that at least one of the potentially-common data sets is associated with the data file. The instructions cause the computer to provide remove indicia indicating that at least one of the potentially-common data sets is associated with a particular portion of the data file.

Various aspects of the invention may provide one or more of the following advantages. Data stored in ways that defeat traditional backup techniques can be backed up while achieving advantages of the traditional backup techniques. Files with little substantive changes and significant non-substantive changes can be backed up with little storage and/or processing, corresponding to the little substantive changes. Data subgroups of larger, aggregated data groups, e.g., files, can be backed up in a non-redundant manner.

These and other advantages of the invention, along with the invention itself, will be more fully understood after a review of the following figures, detailed description, and claims.

DETAILED DESCRIPTION OF PREFERRED EMBODIMENTS

At least some embodiments of the invention provide techniques for determining substantive differential changes in data for storing the substantive changes and/or determining data subsets of larger collections of data that may be similar to other data sets to reduce duplicative storage of similar data sets. Files can be analyzed to determine their substance and compared against the substance of stored files. If the substance of the files differ, then the substantive differences can be stored, while non-substantive differences can be ignored and not backed up. Further, files that contain meaningful subsets can be analyzed to determine the subsets and the subsets compared with stored sets of data. Duplicative sets of data can be bypassed for back up while non-duplicative sets can be backed up.

It has been discovered that certain files do not conform well to traditional differential file backup techniques. Some files contain within them calculated indexes and pointers (administration data) or in many cases garbage bytes. Garbage bytes do not represent any substantive content/information, but are merely empty space. Such files, that may have been slightly modified or not modified at all substantively, appear different, e.g., as if they were nearly completely different than a previous version of the file if a hash code comparison method is used. This "chaotic" behavior means that almost all the "data" for these files, in order to reliably reconstruct the files, would have to be backed up.

Some data files (e.g., some mail system files such as Microsoft Outlook .pst files) also reduce the efficacy of common file elimination backup techniques. These data files treat attachments by embedding the attachments within a larger data set, e.g., a file, containing all mail and attachments. Common file elimination techniques will fail to recognize that a subset of the email file (the attachment) would match an existing data set in a storage repository, unless the entire file containing the attachment matched a stored file.

As used herein, a non-deterministic file or data group is a file or data group in which the physical makeup of the file or data group may change from one moment to the next with very little actual change of the substance or content, or the contents of a file or data group containing data subgroups may change dramatically, while data subgroups of the file or data group may match stored groups. These characteristics can elude traditional backup methods, rendering the traditional backup methods less effective.

Figure 1:
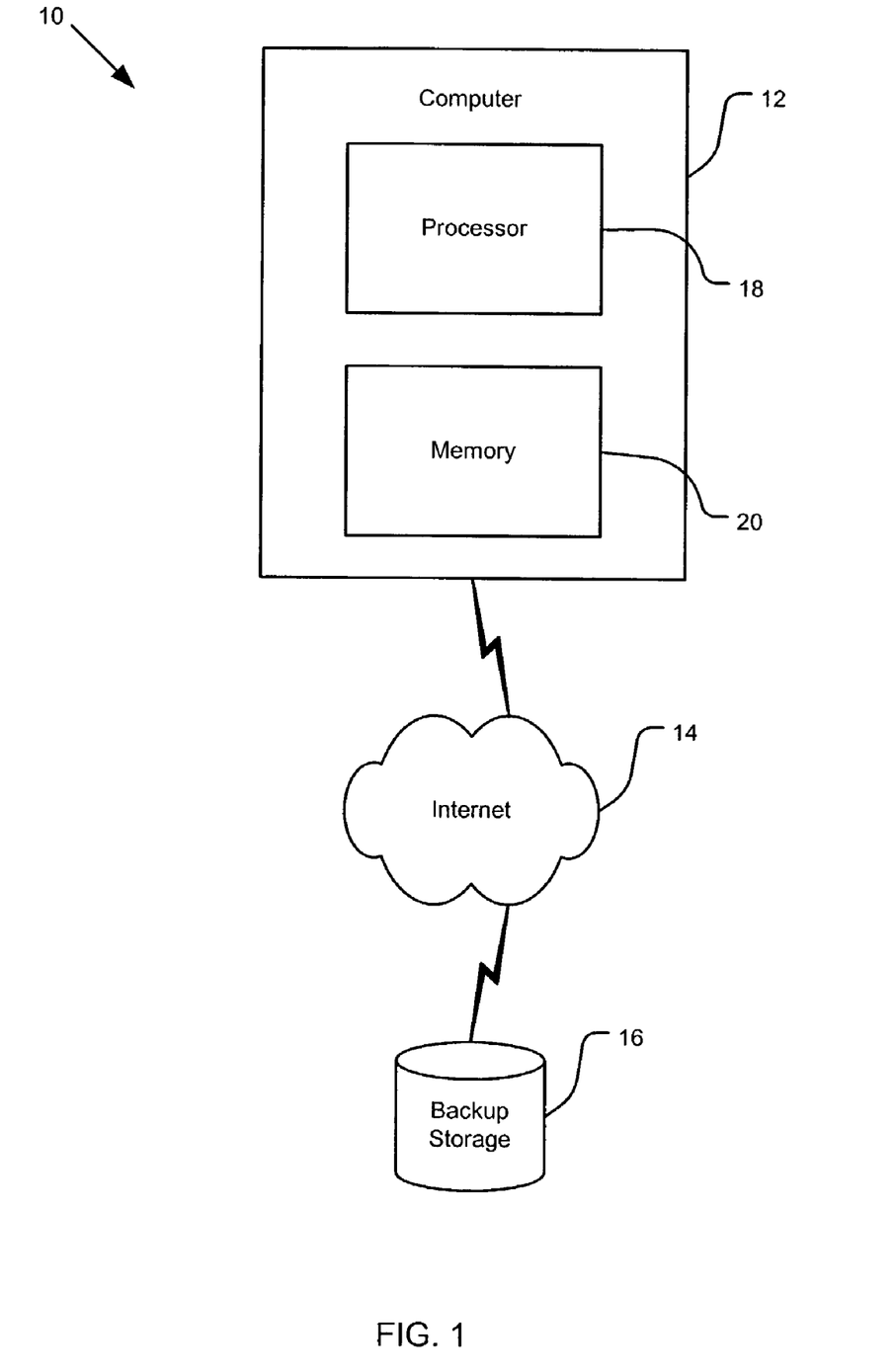
FIG. 1 is a simplified block diagram of a system for backing up data.

Referring to FIG. 1, a system 10 for backing up non-deterministic data includes a computer 12, a communication network 14, and a backup storage 16. The computer 12 includes a processor 18 and memory 20 for storing software instructions that can be executed by the processor 18, and for storing data that may be backed up. The software instructions are configured to be executed by the processor 18 to perform functions as described below. The computer 12 is configured to send data through the network 14 to the storage 16 for backup. The network 14, here shown as the packet-switched network commonly known as the Internet, may be a wide area network (WAN) or a local area network (LAN). Further, the network 14 may be replaced with a simple communication line, the network 14 indicating a communication link between the computer 12 and the storage 16, although the form of the link may vary.

The computer 12 is configured to have the processor 18 assess data, stored in the memory 20, to be backed up and to determine whether and what data to back up. The processor 18 is configured, in conjunction with the stored software, to identify a mechanism through which the actual, substantive information within a file can be accessed. This mechanism preferably identifies only the substantive information and ignores garbage data or administrative portions of the file. The processor 18 is further configured to divide the file into parts representing the real information. The processor 18 is further configured to evaluate the real information for backup, preferably using traditional techniques such as differential backup or common (redundant) file elimination. Evaluation of the real data may be performed with the real data collected in one group (file or memory block) or in the separate parts. The computer 12 can also operate on sets of data other than files.

Registry Backup Background

Registry backup on Windows® NT systems is generally performed by most backup products using a Win32 API (Application Programming Interface) called RegSaveKey, for registry save key. The registry is an inverted tree structured database including descriptions of applications (e.g., types of files such as .txt), user information (e.g., desktop settings), and specific settings (e.g., wordprocessing defaults, email defaults, etc.) for applications identified as keys. A key is a name of a setting in the registry, and a value as used below indicates the value of the setting. RegSaveKey will copy an in-memory version of a registry hive to a storage disk in the location specified by the API user. A hive is a logical branch of the registry and is contained within a single file. For example, the following hives exist on Windows NT 4.0:

SYSTEM
SAM
SECURITY
SOFTWARE
USER

There is one USER hive per user that has an account on the system, but only the logged-on user's USER hive is loaded in memory. All other USER hives remain on disk.

Backing up the registry has traditionally involved calling the Windows RegSaveKey( ) API for each in-memory hive. This API is called because the corresponding hive files on the disk cannot be accessed while the hives are loaded because they are in use. RegSaveKey( ) was traditionally the only mechanism to capture these registry hives as files. The hives would be backed up using a differential backup software engine (e.g., as described in Cane et al U.S. Pat. No. 5,765, 173). This resulted in the hive file(s) being backed up in full the first time and then the binary changes to the hive file(s) being sent on each successive backup. This mechanism, resulted in 100K or so of data on average per hive being backed up on each backup.

With Windows 2000, the size of the registry hive files increased. Using the mechanism for backing up a registry described in the preceding paragraph, the resulting amount of data per backup grew to almost 12 MB on average for the SOFTWARE hive and other hives were generally over 1 MB. For remote users with slow communication connections, sending multiple megabytes (15 MB+) on every backup, usually daily, to a remote Data Center over such slow connections is unacceptable. Also, the backed up data would need to be stored. This means for a Data Center that supports 10,000 Windows 2000 users, 150 GB of data would typically need to be stored each day, for backing up just the users' registry hives.

It was discovered that the data RegSaveKey( ) produced on Windows 2000 was non-deterministic. Two consecutive backups using RegSaveKey, with no real changes to the registry hives produced nearly completely different files. The real data in the files were interspersed with "junk" or filler data, meaningless bytes of whatever happened to be in memory at the time, that varied. Further, the ordering of the data differed even if the "junk", between the real data were ignored.

Along with the above backup size problem is the corresponding retrieval problem. Multiple MB's of data were typically backed up at every backup using a differential technology. The registry hives would be reconstructed by the Data Center and sent back to the user's machine when they were needed for retrieval. The total size of a reconstructed registry, on Windows 2000 would be in excess of 20 MB; and on a slow connection, this would take far too long.

Registry Hive Backup using the System 10

Figure 2:
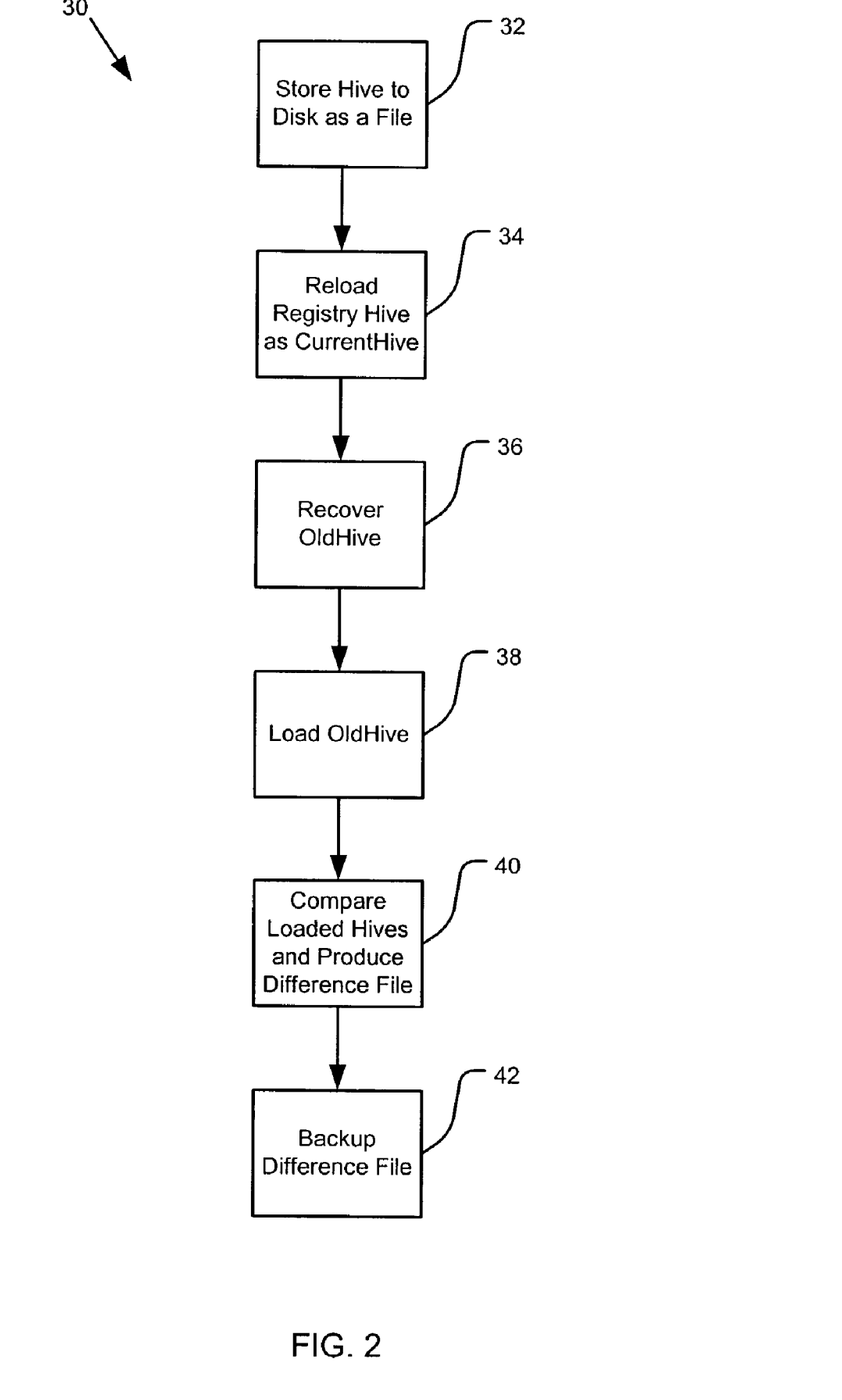
FIGS. 2-3 are block flow diagrams of a process of backing up a non-deterministic registry data file using the system shown in FIG. 1.

In operation, referring to FIG. 2, with further reference to FIG. 1, a process 30 for backing up registry hives using the system 10 includes the stages shown. The process 30, however, is exemplary only and not limiting. The process 30 can be altered, e.g., by having stages added, removed, or rearranged. Further, the process 30 can be adapted to backup other non-deterministic files or other groups of data whose physical makeup (e.g., bits) changes more significantly than their substantive contents do (i.e., substance represented by the physical makeup). The process 30 is preferably implemented in a process running in the background that can perform backup regardless of whether any user is logged on to the system being backed up. The process 30 is further preferably implemented by the background process running under a local system account that has sufficient privileges to accomplish the backup (including access to the registry and any appropriate file). This may allow access to most keys for backup and restore processes, including keys that the user running the backup program may not have permission to access (e.g., due to Windows NT security). The process 30 steps through a registry to find substantive information and compares the substantive information with stored substantive information to determine what substantive information is new, what substantive information has been previously stored, what substantive information has been changed, and what previously-stored substantive information has been removed. Alternatively, the process could build an organized file to which traditional block differential techniques can be applied.

At stage 32, the user manipulates the computer 12 (e.g., using a mouse, keyboard, etc.) to have the Win32 API RegSaveKey( ) store the hive to a disk (e.g., the memory 20) as a file. If this backup is the first backup ever of this hive for the computer 12, then the computer 12 sends this file to the storage 16 and caches it locally as well, and the process 30 ends. The file as loaded in memory is the "base" registry file or "OldHive." If this backup is not the first backup of the hive, then the process 32 proceeds to stage 34.

At stage 34, the computer 12 uses the Win32 API RegLoadKey( ) to reload the registry hive file into the registry. The computer reloads the hive file under a new name, "CurrentHive," for comparison.

At stage 36, the computer 12 recovers the OldHive from the local disk cache. The registry hive is recovered as a file as it had existed at the time of the first backup. As discussed below, there may be multiple OldHives as the OldHive may be periodically reset. For a backup, the computer 12 determines which of the multiple OldHives is the newest OldHive that is at least as old as the hive that is to be backed up.

At stage 38, the restored hive is loaded into the registry. The computer 12 loads the hive restored from cache into the registry under the name "OldHive" for comparison with the CurrentHive.

At stage 40, the computer 12 performs a comparison between the two loaded registry hives, CurrentHive and OldHive. Each difference is written to a difference file named "HKEY_LOCAL_MACHINE$<HiveName>$CL," where <HiveName>is the name of the hive being backed up. The difference file will contain a list of commands to take the originally backed up registry file (base registry file) and add and subtract (and possibly change) information from it so that it is equivalent to the registry hive file as it existed at the time the difference file was produced. A more detailed description of stage 40 is presented below with respect to FIG. 3.

At stage 42, the computer 12 uses standard differential backup techniques to backup the file produced in stage 40. Differences produced will be against the previous difference file created for this registry hive. Preferably, only substantive data in the CurrentHive but not in the OldHive are sent for storage to the backup storage 16 by the computer 12. Some substantive data in the CurrentHive and in the OldHive may be sent, or re-sent, for storage and the system 10 would still be advantageous over storing everything in the CurrentHive or determining differences in traditional ways instead of by analyzing the substantive data. Thus, sending some duplicative data for storage is also within the scope of the invention although at least some, and preferably all, substantive data that are in the CurrentHive and in the OldHive are bypassed for being sent to the backup storage 16.

Figure 3:
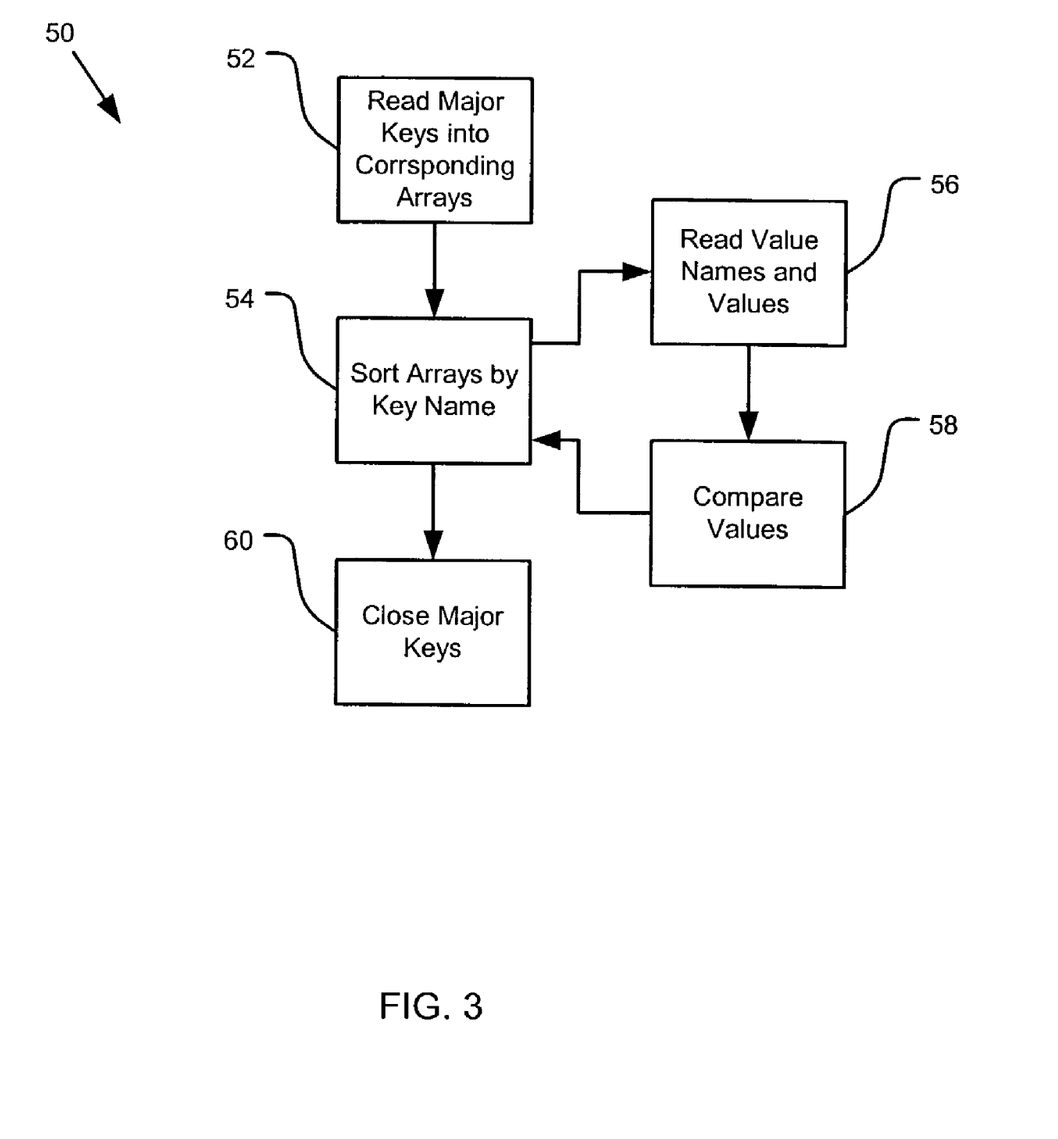

Referring to FIG. 3, with further reference to FIG. 1, stage 40 of FIG. 2 is shown as a process 50 for comparing loaded registry hives using the system 10 and includes the stages shown. The process 50, however, is exemplary only and not limiting. The process 50 can be altered, e.g., by having stages added, removed, or rearranged.

At stage 52, the computer 12 reads major keys (first-level keys) into corresponding key arrays, one array for the CurrentHive and one array for the OldHive. For each key-array element, the computer 12 stores:

| | |
|---|---|
| szKeyName | The Key's Name |
| nNumSubKeys | The Number of Subkeys under this key |
| nNumValues | The Number of Values under this key |
| nACLTag | The unique tag to an Access Control List (ACL) stored in a separate map |
| nClassTag | The unique tag to a Class Name stored in a separate map. |

The actual ACL and Class name are not stored together with the other information for the key as they tend to be identical to other ACL's and classes. By storing a tag to the ACL or Class, there is significant space savings, both in memory during the comparison process 50 and when creating, sending, and storing the difference file that gets backed up. For instance, an ACL may be 2K in length but is attached to 45,000 different keys (90 MB). Preferably only one actual copy of the ACL is kept in a map and mapped to a tag, with a tag referenced by each key.

To get major-key information, the Win32 API function RegQueryInfoKey( ) is used by the computer 12 after opening the key with the RegOpenKey( ) API. To get the keys security information the ACL, the computer 12 uses a call to RegGetKeySecurity( ). The ACL is stored in a separate map and can be looked up using a unique tag. This tag is a unique (for this registry hive) hash code based on the contents of the ACL. If a tag is generated that is identical to an existing tag, but the contents of the ACL differ (hash code collision), then the hash code value is incremented by one until a unique tag is generated.

At stage 54, the computer 12 sorts each of the two key arrays by szKeyName. The computer 12 compares each major key in the CurrentHive key array against the keys in the OldHive key array. Comparing the major keys will yield one of the following results:

1. Key in CurrentHive but not in OldHive: In this case, the computer 12 writes out an "Add Key" command to the file to be backed up. Also, the computer 12 enumerates through all subkeys and values of this major key and adds an "Add Key" and an "Add Value" command for each. Effectively the whole tree under that major subkey is new to the current hive.

2. Key not in CurrentHive but in OldHive: In this case, the computer 12 writes out a "Remove Key" command to the file to be backed up.

3. Key is in Both CurrentHive and OldHive: In this case, the computer 12 determines if a class name or an ACL is different between these two major keys, even though the name is the same. If either is different, then the computer 12 writes the class information and/or ACL information of CurrentHive's key to the file to be backed up (the "difference file") if the corresponding class and/or ACL has not already been written to the difference file. The computer 12 outputs a "Modified Key" command to the file with the tags (the "tag file") for the class and/or ACL'S. The computer 12 compares two value arrays as described with respect to substages 56, 68.

At substage 56, similar to stage 52, value names and values of keys in the CurrentHive and the OldHive that exist under the major keys that matched are read and sorted by the computer 12. These values can be gotten by the computer 12 with an appropriate API such as the RegEnumValue( ) Win32 API. The computer 12 sorts the values into a CurrentHive value array and an OldHive value array.

At substage 58, the computer 12 compares each value under the key being processed in the CurrentHive value array against each value under the key being processed in the OldHive value array. For each comparison, one of the following results will occur:

1. Value in CurrentHive but not in OldHive: The computer 12 writes out an "Add Value" command to the difference file.

2. Value not in Current Hive but in Old Hive: The computer 12 writes out a "Remove Value" command to the difference file.

3. Value is in Both the Current Hive and the Old Hive and is the Same: No output.

4. Value is in Both the Current Hive and the Old Hive but is Different: The computer 12 writes a "Change Value" command (aka modify value command, etc.) to the difference file. The change value command is logically equivalent to a remove value command combined with an add value command, and can be implemented as such.

Also, the computer 12 processes the subkeys of the major key of the CurrentHive and the major key of the OldHive as if they themselves are major keys, according to stages 52 and 54.

At stage 60, the computer 12 closes the major keys. The computer 12 can close the major keys using an appropriate API such as the Win32 API function RegCloseKey( ).

The comparison performed by the process 50 shown in FIG. 3 is performed "on the fly" as the substantive information is obtained. The computer 12 does not wait to produce an entire file of the substantive information of the CurrentHive and then compare that with the substantive information (in another file) of the OldHive. Instead, the computer 12 compares the substantive information from the CurrentHive with the substantive information from the OldHive as the CurrentHive information is obtained. Alternatively, the computer can perform the process 50 by producing two files of substantive information and comparing the substantive-information files, e.g., using standard differential file backup techniques. The substantive information files are change-resistant files in that small changes to the substantive content of the files results in a small change to the physical makeup of the change-resistant files. The "on-the-fly" technique may be preferred in the interests of conserving time and resources.

Figure 4:
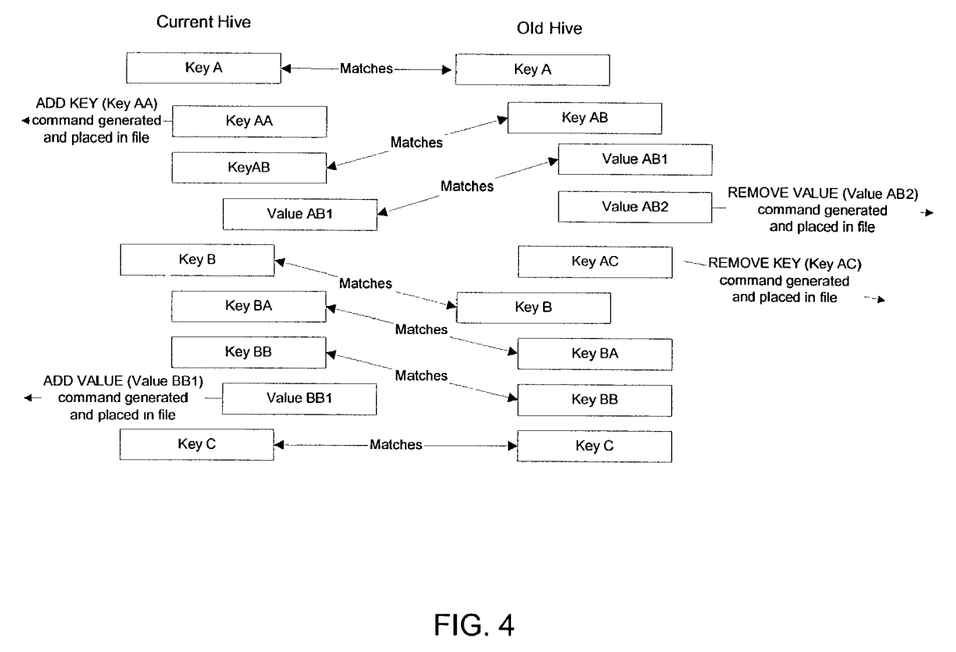
FIG. 4 is a block diagram illustrating backing up of a registry file.

Referring to FIG. 4, ADD KEY, ADD VALUE, REMOVE KEY, and REMOVE VALUE commands are shown illustratively. As shown, Subkey AA of Key A is in the CurrentHive but not the OldHive, and thus a corresponding ADD KEY command is produced and put into the difference file. For each ADD KEY command placed in the difference file, the ACL of the key is added to the difference file if that particular ACL is not already in the difference file, with the same being true for class names. Similarly to the new Subkey AA, Value BB1 of Subkey BB of Key B is in the CurrentHive but not the OldHive, and thus a corresponding ADD VAUE command is produced and put into the difference file. For any ADD command (key or value), enough information is placed in the difference file so that the corresponding key or value can be added back to a registry hive later. The Value AB2 of the Subkey AB of the Key A is in the OldHive but not in the CurrentHive and thus a corresponding REMOVE VALUE command is produced and put into the difference file. Similarly, the Subkey AC of the Key A is in the OldHive but not in the CurrentHive and thus a corresponding REMOVE KEY command is produced and put into the difference file. FIG. 4 does not show any MODIFY KEY commands, but these may be produced and put into the difference file if, for any of the matches of keys or values shown, the corresponding ACL's or class names differ.

Restoring a Backed pp Registry Hive

Figure 5:
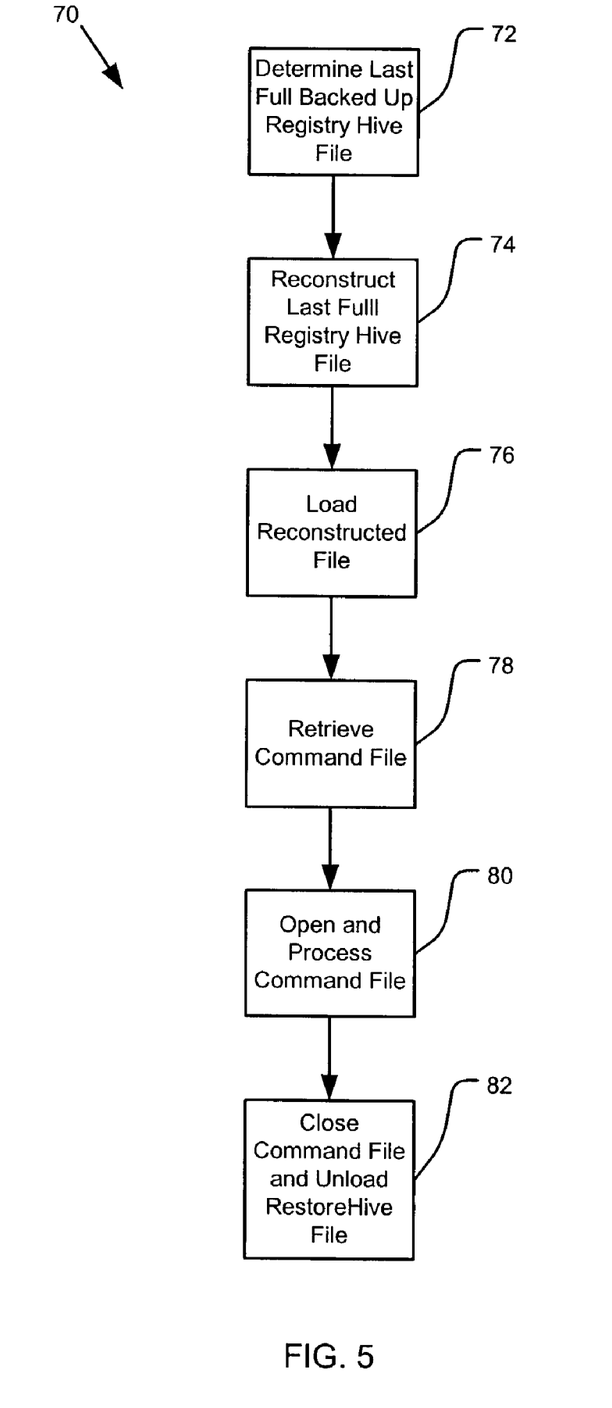
FIG. 5 is a block flow diagram of restoring a backed up registry file.

Referring to FIG. 5, with further reference to FIG. 1, a process 70 for restoring backup registry hives using the system 10 includes the stages shown. The process 70, however, is exemplary only and not limiting. The process 70 can be altered, e.g., by having stages added, removed, or rearranged. Further, the process 70 can be adapted to restore other non-deterministic files or other data groups.

At stage 72, the computer 12 determines the last full registry hive file that was backed up (a base registry file). Periodically, the difference file may be emptied when it gets larger than a desired size. For example, if the difference file becomes larger than the CurrentHive, then the OldHive can be reset to be the CurrentHive, effectively emptying the difference file. Thus, there will be multiple OldHives. For a backup, the computer 12 determines which of the multiple OldHives is the newest OldHive that is at least as old as the hive that is to be backed up.

At stage 74, the computer 12 reconstructs the last full registry hive file from the on-disk cache. If this file is not in the cache (e.g., due to loss of memory from e.g., disk crash, machine loss, etc.), then the computer 12 retrieves the file from the backup storage 16.

At stage 76, the computer 12 loads the reconstructed file from stage 74 as hive "RestoreHive." To do this, a user uses an appropriate API of the computer 12 such as the RegLoad Key( ) Win32 API.

At stage 78, the computer 12 retrieves the appropriate difference file. The computer 12 retrieves the HKEY_LOCAL_MACHINE$<HiveName>$CL file that corresponds to the registry hive backup for which a registry hive file is to be restored.

At stage 80, the computer 12 opens and processes the retrieved difference file. For each command in the file, the computer 12 ADDs or DELetes keys and values (and changes values if change/modify value commands are used) from the loaded "RestoreHive". The computer 12 also applies ACL's as appropriate and uses CLASS ID's to find corresponding classes.

At stage 82, the computer closes the difference file and unloads the "RestoreHive" hive. To unload the RestoreHive file, the computer uses an appropriate function such as the Win32 API function RegUnloadKey( ).

Other embodiments are within the scope and spirit of the invention and the appended claims. For example, although the above description focused on backing up Registries, the techniques described are not limited to backing up Registries or files. The techniques may be applied to any number of other data sets that impede traditional differential file backups. The techniques may be applied using knowledge of the substance or meaning of the contents of the data sets where the data sets contain indices and/or junk data, and/or display chaotic behavior due to modifications.

Further, various techniques may be employed regarding determining and/or storing differences between current files and prior versions of the file. The above description focused on storing a baseline version of a file and at each subsequent backup, determining a difference file that represents the differences between the current version and the baseline version, and storing the difference file, with a new baseline file possibly being periodically stored. Alternatively, a file to be backed up can be stored locally and at each subsequent backup, a logical difference can be determined between the most-recently backed up version (as opposed to a baseline version) and the current version, and the determined difference stored as a difference file. Further, a binary version of a file can be converted to a canonical form that is amenable to differential backup, and this canonical form backed up. At each subsequent backup, the current file can be converted to the canonical form, and traditional differential backup processes applied to determine the differences between the two canonical-form files. Still other techniques are possible and within the scope and spirit of the invention and claims. Restoration using these alternative techniques can be performed by focusing on the substantive data of the backed up files.

Aggregated Block Backup using the System 10

Referring again to FIG. 1, the system 10 can also be used to efficiently backup files or other data sets that break the effectiveness of typical common/redundant-file elimination (CFE/RFE) backup techniques. CFE-breaking files that the computer 12 is configured to efficiently backup contain aggregations of files or other data groups, such as email attachments, with indexes or other indicia of data subgroups within the larger file, resembling a database. With such CFE-breaking files, data subgroups may be identical to other data subgroups or files to be backed up. The computer 12 is configured to determine the individual data subgroups and reduce, and preferably eliminate, redundant backup of the same data subgroup. Thus, CFE techniques are not limited to application to files, but may be applied to any group of data.

Figure 6:
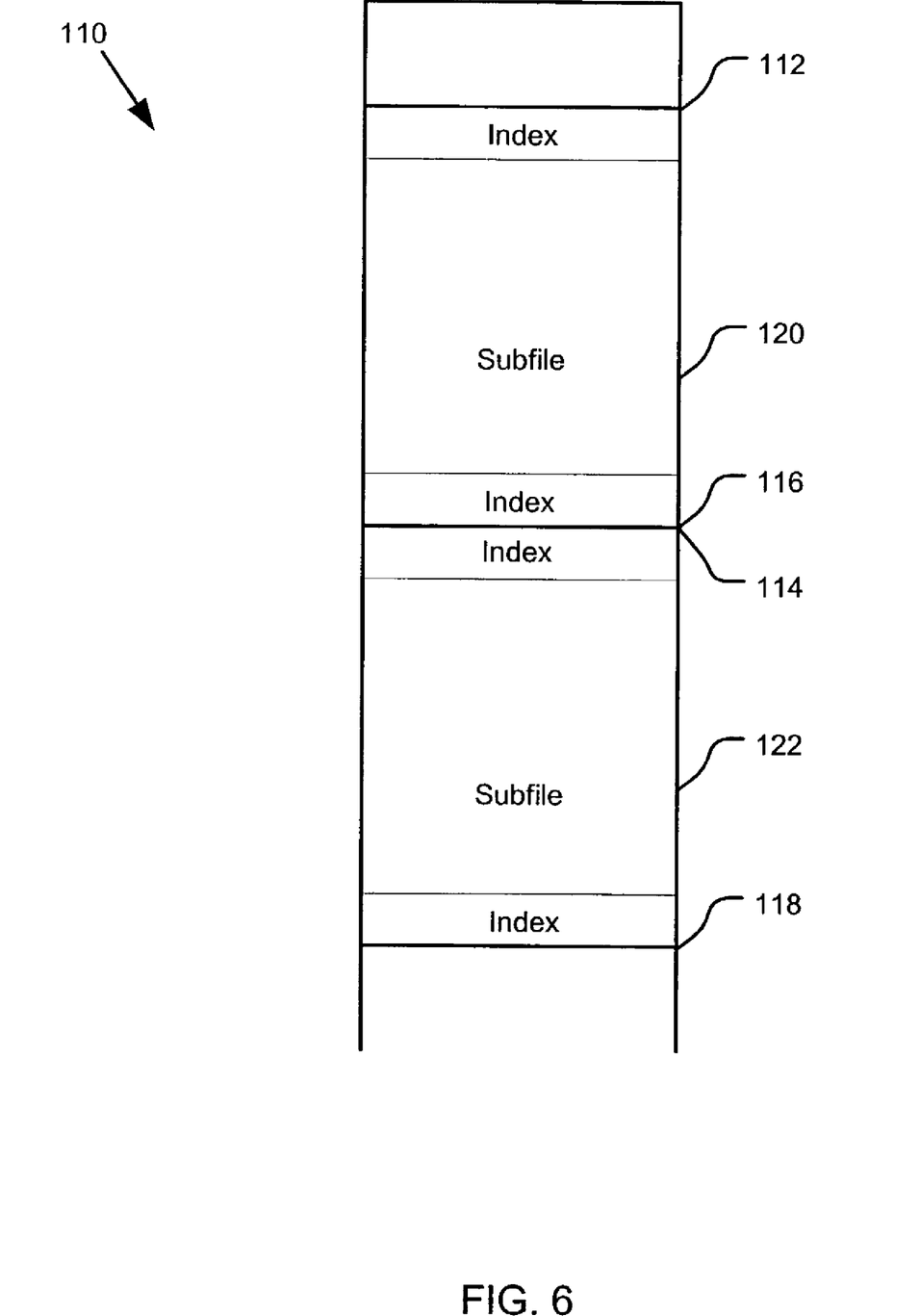
FIG. 6 is a simplified diagram of a portion of an aggregate file containing data subgroups.

Referring to FIG. 6, an exemplary CFE-breaking file 110 is shown logically, as the file 110 may be physically divided among many, non-consecutive memory locations with appropriate pointers. The file 110 includes indexes indicating the beginnings 112, 114 and ends 116, 118 of data subgroups 120, 122. Other data subgroups may be contained in the file 110, but only the two data subgroups 120, 122 are shown for exemplary purposes. Examples of the data subgroups 120, 122 are an email and an associated attachment, or an email folder and an associated attachment, although these examples are not limiting. Data subgroups may be files or other related sets of data that are not files.

Figure 7:
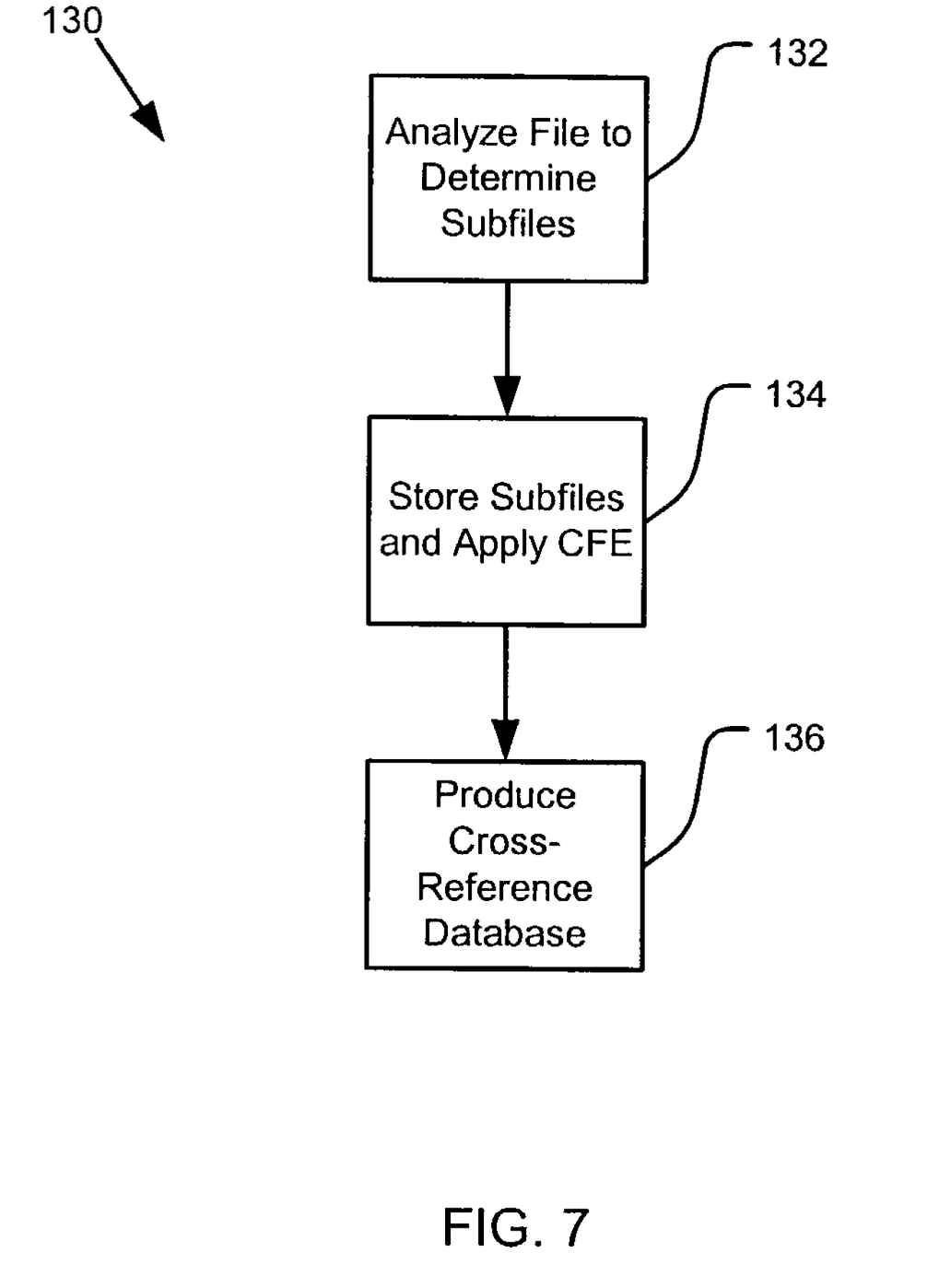
FIG. 7 is a block flow diagram of a process of backing up the aggregate file shown in FIG. 6.

Referring to FIG. 7, with further reference to FIGS. 1 and 6, a process 130 for backing up CFE-breaking files using the system 10 includes the stages shown. The process 130, however, is exemplary only and not limiting. The process 130 can be altered, e.g., by having stages added, removed, or rearranged. The process 130 may be applied to data sets other than files.

At stage 132, the computer 12 analyzes the file 110 to determine the data subgroups 120, 122. The computer 12 finds the indexes 112, 114, 116, 118 in the file 110 to determine the beginnings and ends of the data subgroups 120, 122, and thus the content of the data subgroups 120, 122.

At stage 134, the computer 12 stores the data subgroups 120, 122 and applies redundant/common file elimination backup. The computer 12 stores the data subgroups 120, 122 in temporary storage, e.g., cache, as the data subgroups 120, 122 are determined. The computer 12 also applies standard common file elimination techniques to each stored data subgroup, as it is determined, relative to previously-stored files in the backup storage 16. Alternatively, the computer 12 can store the data subgroups 120, 122 into more permanent storage, and perform common file elimination on the stored groups and/or files collectively.

At stage 136, a cross-referencing database is produced to relate redundant data subgroups with their associated data subgroups. For example, if the data subgroup 120 is an email message and the data subgroup 122 is an attachment that is redundant with a file already stored in the backup storage 16, then the data subgroup 122 will not be backed up in its entirety. The computer 12 will insert a reference into the cross-referencing database that relates the data subgroup 120 with the already-stored file that is the same as the data subgroup 122. Thus, the computer 12 can use the cross-referencing database to determine what data subgroups, e.g., the data subgroup 120, in the file 110 have associated data subgroups, e.g., the data subgroup 122, that were redundant, find the stored redundant data subgroup, and reassemble the file 110 using the stored redundant data subgroup as the data subgroup, here the data subgroup 122, that was not stored in its entirety with the file 110.

Still other embodiments are within the scope and spirit of the appended claims. For example, due to the nature of software, functions described above can be implemented using software, hardware, firmware, hardwiring, or combinations of any of these. Features implementing functions may also be physically located at various positions, including being distributed such that portions of functions are implemented at different physical locations.

What is claimed is:

1. A system for backing up desired data from data to be used by an associated software application, the data comprising substantive information and non-substantive information and the system comprising:
   A) a communication link configured to transfer information between the system and a backup-storage facility for storing backed up data; and
   B) a processor coupled to the communication link and configured to:
      (i) map the desired data to a change-resistant format;
      (ii) identify desired substantive information comprising the substantive information of the change-resistant formatted desired data;
      (iii) identify stored substantive information comprising the substantive information of stored data;
      (iv) compare the desired substantive information with the stored substantive information;
      (v) make a determination whether, to the associated software application, there is any difference between the desired substantive information and the stored substantive information;
      (vi) in accordance with the determination, select portions of the change-resistant formatted desired data to be transferred; and
      (vii) transfer the portions thus selected over the communication link for storage.

2. The system of claim 1 wherein the processor is configured to bypass at least some of the desired substantive information, for transfer for storage, that is present in the stored substantive information.

3. The system of claim 1 wherein the processor is configured to transfer for storage only desired substantive information that is absent from the stored substantive information.

4. The system of claim 1 wherein the processor is further configured to transfer, over the communication line, indicia that some of the desired substantive information is absent from the stored substantive information and that some of the stored substantive information is absent from the desired substantive information.

5. The system of claim 4 wherein the indicia include at least one of an add key command, an add value command, a remove key command, a remove value command, and a change value command.

6. A storage medium containing instructions readable by a computer system that is coupled with a backup storage by a communications link to configure the computer system to back up desired data from data to be used by an associated software application, the data comprising substantive information and non-substantive information and the instructions comprising instructions to:
   A) map the desired data to a change-resistant format;
   B) identify desired substantive information comprising the substantive information of the change-resistant formatted desired data;
   C) identify stored substantive information comprising the substantive information of stored data, the stored data comprising data that have been stored in a backup storage;
   D) compare the desired substantive information with the stored substantive Information;
   E) make a determination whether, to the associated software application, there is any difference between the desired substantive information and the stored substantive information;
   F) in accordance with the determination, select portions of the change-resistant formatted desired data to be transferred; and
   G) transfer the portions thus selected over the communication link for storage.

7. The storage medium of claim 6 wherein the instructions configure the computer system to bypass at least some of the desired substantive information, for transfer for storage, that is present in the stored substantive information.

8. The storage medium of claim 6 wherein the instructions configure the computer system to transfer for storage only if the desired substantive information is absent from the stored substantive information.

9. A computer-implemented method for backing up desired data from data comprising substantive information and non-substantive information, the method comprising:
   using a processor to perform the computer-implemented steps of:
      mapping the desired data to a change-resistant format;
      identifying desired substantive information comprising the substantive information of the change-resistant formatted desired data;
      identifying stored substantive information comprising the substantive information of stored data;
      comparing the desired substantive information with the stored substantive information;
      making a determination whether there is any difference between the desired substantive information and the stored substantive information;
      in accordance with the determination, selecting portions of the change-resistant formatted desired data to be transferred; and
      transferring the portions thus selected over the communication link to a storage medium.

10. The computer-implemented method of claim 9 further comprising using the processor to perform the computer-implemented step of bypassing at least some of the desired substantive information, for transfer to the storage medium, that is present in the stored substantive information.

11. The computer-implemented method in claim 9 further comprising using the processor to perform the computer-implemented step of transferring to the storage medium only desired substantive information that is absent from the stored substantive information.

12. The computer-implemented method in claim 9 further comprising using the processor to perform the computer-implemented step of transferring, over the communication line, indicia that some of the desired substantive information is absent from the stored substantive information and that some of the stored substantive information is absent from the desired substantive information.

13. A computer program product residing on a computer-readable storage medium comprising computer-executable instructions for causing a computer to back up desired data from data to be used by an associated software application, the data comprising substantive information and non-substantive information and the instructions for back up further comprising instructions to:
   A) map the desired data to a change-resistant format;
   B) identify desired substantive information comprising the substantive information of the change-resistant formatted desired data;
   C) identify stored substantive information comprising the substantive information of stored data, the stored data comprising data that have been stored in a backup storage;
   D) compare the desired substantive information with the stored substantive information;
   E) make a determination whether, to the associated software application, there is any difference between the desired substantive information and the stored substantive information;
   F) in accordance with the determination, select portions of the change-resistant formatted desired data to be transferred; and
   G) transfer the portions thus selected over the communication link for storage.

14. The computer program product of claim 13,
   wherein identifying the desired substantive information further comprises conducting an analysis of a data file formatted for use by an application that treats the data in the data file as containing data subgroups, the analysis further comprising:
   identifying the data subgroups within the data file, and
   determining the content of the data subgroups, the content comprising substantive information and non-substantive information;
   wherein making the determination whether, to the associated software application, there is any difference between the desired substantive information and the stored substantive information further comprises making a comparison of the substantive information of the data subgroups with stored other data sets to determine whether any of the substantive information of the data subgroups has data in common with the stored other data sets; and
   wherein selecting portions of the desired data to be transferred and transferring the portions thus selected over the communication link for storage further comprises backing up data subgroups in accordance with the comparison.

15. The computer program product of claim 14 wherein the instructions cause the computer to back up only data subgroups that are absent from the stored other data sets.

16. The computer program product of claim 14 wherein the instructions cause the computer to store the data subgroups as separate files for the comparison.

17. The computer program product of claim 13 wherein the instructions cause the computer to make the determination using a common file elimination technique.

18. The computer program product of claim 14 wherein the instructions cause the computer to provide remove indicia indicating that at least one of the stored other data sets is associated with the data file.

19. The computer program product of claim 14 wherein the instructions cause the computer to provide remove indicia indicating that at least one of the stored other data sets is associated with a particular portion of the data file.

* * * * *

UNITED STATES PATENT AND TRADEMARK OFFICE
CERTIFICATE OF CORRECTION

PATENT NO. : 7,509,356 B2 Page 1 of 1
APPLICATION NO. : 10/235304
DATED : March 24, 2009
INVENTOR(S) : David A. Cane et al.

It is certified that error appears in the above-identified patent and that said Letters Patent is hereby corrected as shown below:

Claim 6, column 12, line 15, "Information" should read --information--.

Signed and Sealed this

Twelfth Day of May, 2009

JOHN DOLL
*Acting Director of the United States Patent and Trademark Office*